Oct. 15, 1957 C. E. HEIN ET AL 2,809,535
CLUTCH AND CONTROLS THEREFOR
Filed July 25, 1956
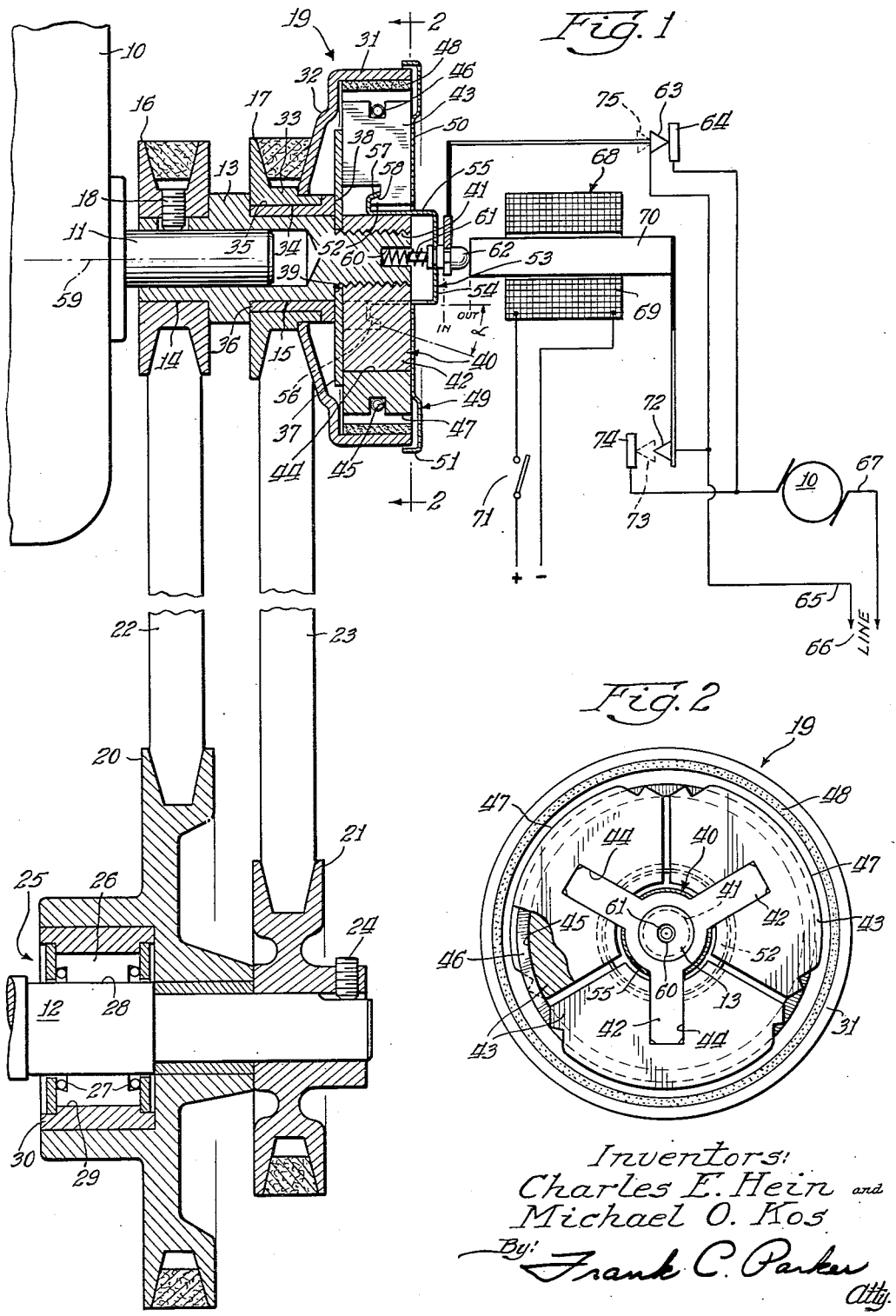
Inventors:
Charles E. Hein and
Michael O. Kos
By: Frank C. Parker
Atty.

United States Patent Office 2,809,535
Patented Oct. 15, 1957

2,809,535

CLUTCH AND CONTROLS THEREFOR

Charles E. Hein, Newfield, and Michael O. Kos, Ithaca, N. Y., assignors to Morse Chain Company, Ithaca, N. Y., a corporation of New York Application July 25, 1956, Serial No. 600,063

14 Claims. (Cl. 74—472)

The present invention relates in general to centrifugal clutches and is particularly concerned with the mechanism and arrangement for controlling the engagement of a centrifugal clutch.

It is a principal object of the present invention to provide a centrifugal clutch capable of being engaged during rotation of the driving member thereof at a predetermined moment rather than in response only to the speed of rotation and to enable the control of such engagement by a relatively small force which may be applied manually or otherwise.

More specifically, the present invention has for one of its important objects, the provision of a control circuit for completing an energizing circuit to an electric driving motor wherein breaking means are included for breaking the driving motor energizing circuit and holding it in a broken condition until the driving clutch member decelerates to a speed which will permit disengagement of the clutch.

The present invention is particularly applicable to driving power trains for household appliances, such as automatic washing machines, wherein it is desirable to have a relatively low speed ratio drive during a portion of the operating cycle and a relatively high speed drive during another portion of the operating cycle. The present invention provides a clutch control arrangement which is particularly suited to these requirements.

More specifically, the low speed ratio drive includes a one-way clutch which is capable of overrunning when the centrifugal clutch becomes engaged in order to complete the high speed drive. The control means positively prevents the engagement of the centrifugal clutch until the desired moment, assuming that the speed of rotation of the centrifugal clutch friction shoes is sufficient to effect engagement of the clutch. The control means then, upon being actuated, permits the centrifugal clutch to become engaged and to remain engaged for so long a period as the control means is held in an actuated position. Upon actuation of the control means, the electric driving motor circuit is automatically broken and due to blocking means associated with the control means and with the centrifugal friction clutch shoes, the motor circuit remains broken until the friction clutch shoes become retracted from engagement with the driven clutch drum. Upon retraction of the driving clutch shoes, the motor circuit is again established and power once again is transmitted to the load through the low speed power train.

A particular advantage of the present invention is that it enables the engagement and disengagement of a centrifugal clutch at a predetermined and controlled moment. Further, the structural arrangements contemplated make it possible to control the engagement and disengagement of the centrifugal clutch by a relatively small control force in relation to the torque transmitted by the clutch. The use of friction shoes engageable with a cylindrical drum automatically incorporates a torque limiting feature and also the smooth gradual engagement normally accompanying the operation of a friction clutch is inherent in the design disclosed herein. As a result of the ability of the present clutch to engage smoothly and gradually it is possible to use a smaller driving motor since it is not necessary to provide the relatively high torque which would otherwise be necessary in order to accelerate the driven member with sudden engagement of the clutch parts.

The foregoing objects and advantages of the present invention as well as many others will become apparent from the following detailed description thereof when read in conjunction with the accompanying drawings wherein:

Fig. 1 is a general view illustrating the features of the present invention and showing the improved clutch in vertical cross section and the control means therefor schematically; and Fig. 2 is a sectional view taken substantially along the line 2—2 in Fig. 1 and showing further details of construction of the centrifugal clutch mechanism.

With reference to the drawings, wherein the same reference numerals have been utilized in both figures in order to identify identical parts, the invention includes an electric driving motor 10, shown fragmentarily in the upper left hand corner of Fig. 1 and shown schematically at the right hand edge of Fig. 1. The driving motor 10 has a drive shaft 11 and shaft 12 represents a load shaft which is to be driven at either a relatively low speed ratio or a relatively high speed ratio relative to shaft 11.

A sleeve member 13 is concentrically mounted over the end of shaft 11 and is turned down respectively at 14 and 15 in order to receive a pair of pulleys 16 and 17. A set screw 18 threaded into pulley 16 passes through a suitable aperture in sleeve member 13 and holds the sleeve 13 in a fixed position on shaft 11. A centrifugal clutch, designated generally by reference numeral 19 and described more fully hereinafter, is provided for selectively connecting the pulley 17 to the sleeve shaft 13.

Mounted concentrically around the driven shaft 12 are a pair of pulleys 20 and 21 and these pulleys are disposed in alignment with pulleys 16 and 17. Suitable belts 22 and 23 respectively interconnect pulleys 16 and 17 with driven pulleys 20 and 21.

The pulley 21 is the high speed ratio pulley and is fixedly mounted on shaft 12 by means of a set screw 24. The pulley 20 is the low speed ratio pulley and is rotatably mounted on shaft 12. A one-way clutch 25 is provided for selectively connecting the pulley 20 with the shaft 12 and is adapted to complete a drive in one direction of rotation from pulley 20 to shaft 12 but permit the shaft 12 to overrun the pulley in this same direction of rotation. It will be understood that the one-way clutch 25 may be of any desired type and in the embodiment disclosed herein, the one-way clutch 25 comprises a plurality of wedging elements of sprags 26 which are constantly energized or biased, by means of a pair of spring devices 27, toward wedging engagement between an inner race 28 formed on the outer periphery of shaft 12 and an outer race 29 formed on the inner periphery of a sleeve member 30 fixedly connected with gear 20.

The centrifugal clutch 19 comprises a driven part consisting of a substantially cylindrical drum 31 having a radially inwardly directed flange portion 32 which forms one side of pulley 17. The flange portion 32 is fixedly secured to the other portion 33 of pulley 17 and the portion 33 of pulley 17 is provided at 34 with a bearing surface concentric with a bearing surface 35 on a bushing 36 so as to enable relative rotation of pulley 17 and driven clutch drum 31 about sleeve shaft 13.

A substantially flat circular disc 37 is positioned around the sleeve shaft 13 in abutment with the shoulder 38 formed on bushing 36 and with a shoulder 39 formed on sleeve 13. The disc member 37 is held in the position shown in Fig. 1 by means of a spider indicated generally by reference numeral 40. The spider 40 is internally threaded at 41 and cooperates with mating external threads formed on the end of sleeve shaft 13 so that when the spider is turned tightly on the end of shaft 13 it abuts the disc 37 and retains it, as well as bushing member 36, in substantially fixed position on shaft 13. The spider 40 comprises a substantially cylindrical portion 41 and a plurality of peripherally spaced radially extending arms 42. A plurality of centrifugally responsive weights 43 are provided with radially extending slots 44 for receiving the spider arms 42 and the spider arms 42 function to retain the weights 43 in their proper aligned positions. The weights 43 are provided with radially outwardly opening peripheral grooves 45 and a garter spring 46, mounted within grooves 45 and under a predetermined tension, functions to bias the weights 43 radially inwardly into fully seated position on spider arms 42. Each of the weights 43 is provided with a substantially cylindrically shaped external surface 47 adapted to frictionally engage a friction lining 48 fixedly mounted on the interior surface of drum 31. The exterior cylindrical surfaces 47 and the interior surface of friction lining 48 comprise the engaging surfaces of the centrifugal friction clutch 19. In order to retain the centrifugal weights 43 in fixed axial position relative to shaft 13, a suitable disc member 49 is provided with a portion 50 which, together with disc 37, function to hold the weights 43 in axial alignment. The disc member 49 is provided with an axially extending peripheral flange 51 which fits snugly over the outer periphery of drum 31 in order to retain the disc member 49 in fixed position relative to the drum 31.

Each of the centrifugal weights 43 is cut away on one side to provide a retaining projection 52 thereon. A control member, designated by reference numeral 53, comprises a disc-like portion 54 and cylindrically shaped portions 55 positioned for sliding movement over the hub 41 of spider 40 and terminating in generally radially outwardly extending projections 56 cooperable with retaining projections 52 on each of the weights 43. The cooperable projections 56 and 52 hold the weights 43 disengaged from the friction lining 48 on the interior surface of drum 41 irrespective of the speed of rotation of sleeve shaft 13 and, in turn, irrespective of the centrifugal force acting on the weights 43 and tending to urge them radially outwardly.

The cooperable projections 52 on weights 43 and projections 56 on control member 53 are respectively provided with generally conically shaped complementary mating surfaces 57 and 58. The mating surfaces 57 and 58 are disposed at a slight angle of the order of, between approximately 3° and 8°, designated by symbol $\alpha$, from the axis of rotation of the clutch 19, designated by line 59. The precise value of the angle $\alpha$ is somewhat dependent upon the mass of the weights 43, the force exerted by garter spring 46, the speed of rotation of the clutch and the coefficient of friction between the mating surfaces 57 and 58. In a particular operative embodiment of the present invention it has been found that, if the angle $\alpha$ is equal to approximately 5°, the clutch functions very satisfactorily. It is understood that the control member 53 must be capable of being moved axially to the left when the weights 43 are being urged outwardly in response to centrifugal force due to rotation thereof. If the angle $\alpha$ is substantially less than 5° then the "bite" between mating surfaces 57 and 58 is so great that it requires a rather great force to move the control member 53 to the left in order to release the weights. On the other hand, if the angle $\alpha$ is substantially greater than 5° and the coefficient of friction between the mating surfaces 57 and 58 is not great enough, then the centrifugal force acting on the weights 43 will be capable of overcoming the biasing force of spring 46 as well as the retaining force exerted by the projections 56 on the projections 52.

The sleeve shaft 13 is provided with an axially extending aperture 60 and a compression spring 61 disposed within the aperture 60 biases the control member 53 constantly to the right. A suitable button element 62 is fixed to control member 53 and carries a movable switch member 63. When the control member 53 is in the position shown in Fig. 1, it being biased to this position by means of compression spring 61, the movable contact or switch 63 engages a fixed contact point or switch member 64 in order to complete an energizing circuit from one side 65 of a power line 66, through motor 10 to the other side 67 of power line 66.

Control means for control member 53 are provided and comprise a solenoid 68 consisting of a winding 69 and an armature 70. An energizing circuit for the winding 69 of the solenoid 68 extends from a positive lead, through a switch 71 and through the coil 69 to a negative lead. When the switch 71 is closed, the winding 69 is energized and armature 70 moves from its "out" position to its "in" position against the biasing force exerted by compression spring 61 and in so moving the armature 70 thereby moves the control member 53 to a position where projections 56 are disengaged from projections 52 on centrifugal weights 43. A movable switch member 72 is carried by the armature 70 and when the armature 70 moves to its "in" position the movable switch member 72 moves to the position shown in dotted lines, and designated by reference numeral 73, into engagement with a fixed contact or switch point 74 and this completes an energizing circuit for driving motor 10 from lead 65 through the motor 10 to lead 67. When the armature 70 moves to its "in" position it will be noted that the movable switch 63 is moved to the dotted position 75 and this opens the switch 63—64 so that the motor energizing circuit is completed only through switch 72—74.

The operation of the driving mechanism and controls for the centrifugal clutch 17 will now be described. It will be assumed that the motor circuit has just been completed in order to start the motor 10 and under these conditions, the weights 43 will be in retracted positions with the control member 53 in the "out" position and switch 63—64 closed. The motor 10 drives shaft 11 and will, in turn, drive pulley 16 as well as the driving parts including weights 43 of the centrifugal clutch 19. Under these conditions, belt 22 drives pulley 20 and this pulley, in turn, drives shaft 12 at a low speed ratio, this drive train passing through overrunning clutch 25.

It will be assumed that it is desired to complete the high speed ratio drive to shaft 12 and in order to accomplish this, switch 71 is closed in order to actuate solenoid 68. Upon actuation of solenoid 68, the armature 70 moves from the "out" to the "in" position and this movement, in turn, moves control member 53 to the left and retracts the retaining projections 56 from engagement with projections 52 on the inner periphery of weights 43. At this time, then, if the shafts 11 and 13 are rotating sufficiently fast, or are rotating above a predetermined speed of rotation, centrifugal force acting on weights 43 urges the weights 43 outwardly to bring their outer peripheries 47 into frictional engagement with the inner periphery of friction lining 48 in order to effect engagement of centrifugal clutch 19 and thereby drive pulley 17. For so long as switch 71 remains closed, the armature 70 will remain in its "in" position and switch 72—74 will be closed and switch 63—64 will be opened, the former switch 72—74 completing the circuit to the motor 10 at this time.

Upon the opening of switch 71, the armature 70 moves to its "out" position, thereby opening switch 72—74 and breaking the circuit to motor 10. As long as the weights 43 engage friction lining 48, the leftwardly facing sides of projections 52 are opposite the ends of projections 56 on control member 53 and this prevents the return of control member 53 to its "out" position under the urging of spring 61. Therefore, the switch 63—64 is also opened, and there is no power circuit to the motor 10.

While all power to the motor 10 is cut off, it decelerates quite rapidly so that the weights 43 retract under the biasing force of spring 46 and thereby enable projections 56 on control member 53 to re-enter the cutaway portions of weights 43 and again become seated against projections 52. Upon the return of the control member 53 to its "out" position, switch 63—64 is again closed and the power circuit to the motor 10 is again completed and the low speed ratio drive to shaft 10 is resumed.

It will be borne in mind that before the centrifugal clutch 19 is engaged under any circumstances the driven or load shaft 12 is being driven at the low speed ratio by means of pulleys 16 and 20. The driven clutch drum 31 is therefore rotating in the same direction as shafts 11 and 13 but at a slightly reduced rate of speed due to the relative differences in sizes between pulleys 20 and 21. The centrifugal clutch 19, upon engagement, need only increase the speed of drum 31 and pulley 17 from this relatively slow speed to a one-to-one speed with respect to shaft 13. It is therefore apparent that the torque required to be transmitted by centrifugal clutch 19 is substantially less than the torque which would be required were the driven clutch drum 31 being started from a stationary condition. Further, inasmuch as the centrifugal clutch 19 is a friction clutch and engages gradually, it is not necessary that the motor 10 be capable of delivering as much torque as would be required if the engagement of clutch 19 were more sudden or abrupt.

It is contemplated that numerous changes and modifications may be made in the present invention without departing from the spirit or scope thereof.

What is claimed is:

1. In combination, a driving motor, a drive shaft drivingly connected with said driving motor, a driven shaft, transmission means drivingly interconnecting said shafts and including means for respectively providing either a high ratio or a low ratio drive between said shafts, said low ratio drive means including a one-way clutch for completing the low ratio drive and adapted to overrun when the high ratio drive is established, centrifugal clutch means engageable for completing said high ratio drive between said shafts, said centrifugal clutch means including a driven member drivingly interconnected with said driven shaft and a plurality of centrifugally responsive friction shoes drivingly interconnected with said drive shaft and engageable with the driven member above a predetermined speed of said drive shaft to complete said high ratio drive, a source of power for actuating said motor, control means for said clutch and motor and including a first motor power cut-off, a second motor power cut-off, a holder effective upon actuation for retaining said centrifugally responsive friction shoes out of engagement with the driven member at all speeds of said drive shaft, said holder being operably interconnected with said first motor power cut-off and the latter being effective to maintain said power source connected with the motor whenever said holder is effective to retain said friction shoes out of engagement with said driven clutch member, and means operably interconnected with said second motor power cut-off and simultaneously operable to deactuate said holder so as to enable engagement of said centrifugally responsive friction shoes with said driven means upon the drive shaft reaching said predetermined speed and to close said second motor power cut-off to thereby retain said power source connected with the motor even though said first motor power cut-off is opened upon the deactuation of said holder.

2. In combination, an electric driving motor, a drive shaft drivingly interconnected with said driving motor, a driven shaft, transmission means drivingly interconnecting said shafts and including means for respectively providing either a high ratio or a low ratio drive between said shafts, said low ratio drive means including a one-way clutch adapted to overrun when the high ratio drive is established, centrifugal clutch means engageable for completing said high ratio drive between said shafts, said centrifugal clutch means including a driven member drivingly interconnected with said driven shaft and a plurality of centrifugally responsive friction shoes drivingly interconnected with said drive shaft and engageable with the driven member above a predetermined speed of said drive shaft to complete said high ratio drive, a source of electrical energy and including a circuit connected with the driving motor, control means for said clutch and motor and including a first switch in said circuit and a second switch in said circuit, a holder effective upon actuation for retaining said centrifugally responsive friction shoes out of engagement with the driven member at all speeds of said drive shaft, said holder being operably interconnected with said first switch and the latter being effective to maintain said electrical circuit closed to said motor whenever said holder is effective to retain said friction shoes out of engagement with said driven clutch member, and means operably interconnected with said second switch and simultaneously operable to de-actuate said holder so as to enable engagement of said centrifugally responsive friction shoes with said driven means upon the drive shaft reaching said predetermined speed and to close said second switch to thereby retain said motor circuit closed even though said first switch is opened upon the actuation of said holder.

3. In combination, an electric driving motor, a drive shaft drivingly interconnected with said driving motor, a driven shaft, transmission means drivingly interconnecting said shafts and including means for respectively providing either a high ratio or a low ratio drive between said shafts, said low ratio drive means including a one-way clutch adapted to overrun when the high ratio drive is established, centrifugal clutch means engageable for completing said high ratio drive between said shafts, said centrifugal clutch means including a driven member drivingly interconnected with said driven shaft and a plurality of centrifugally responsive friction shoes drivingly interconnected with said drive shaft and engageable with the driven member above a predetermined speed of said drive shaft to complete said high ratio drive, a source of electrical energy and including a circuit connected with the driving motor, control means for said clutch and motor and including a first switch in said circuit and a second switch in said circuit, a holder effective upon actuation for retaining said centrifugally responsive friction shoes out of engagement with the driven member at all speeds of said drive shaft, said holder being operably interconnected with said first switch and the latter being effective to maintain said electrical circuit closed to said motor whenever said holder is effective to retain said friction shoes out of engagement with said driven clutch member, and a control solenoid having an armature operably interconnected with said second switch and simultaneously operable to de-actuate said holder so as to enable engagement of said centrifugally responsive friction shoes with said driven means upon the drive shaft reaching said predetermined speed and to close said second switch to thereby retain said motor circuit closed even though said first switch is opened upon the de-actuation of said holder.

4. In combination, a driving shaft, a first drive member secured to rotate with said shaft, a second drive member rotatably mounted with respect to said shaft, clutch means for drivingly interconnecting said second drive member and said shaft and comprising a clutch drum drivingly connected with said second drive member and centrifugally responsive friction shoes drivingly connected with said shaft and engageable with said drum above a predetermined speed of said shaft, each of said friction shoes including means defining a retaining projection thereon, a control member having shoulder means thereon respectively cooperable with the projection on each of said friction shoes for retaining the latter disengaged from the clutch drum irrespective of the speed of said shaft, said control member being movable so as to disengage the shoulder means thereon from the projections on said friction shoes to thereby enable engagement of the shoes with said drum in response to centrifugal force, and resilient means acting on said control member and normally effective to bias it toward a position where the shoulder means thereon engage the projections on the friction shoes and thus retain the latter disengaged from said clutch drum.

5. In combination, a driving shaft, a first drive member secured to rotate with said shaft, a second drive member rotatably mounted with respect to said shaft, clutch means for drivingly interconnecting said second drive member and said shaft and comprising a clutch drum drivingly connected with said second drive member and centrifugally responsive friction shoes drivingly connected with said shaft and engageable with said drum above a predetermined speed of said shaft, each of said friction shoes including means defining a retaining projection thereon, a generally cylindrical control member disposed over the end of said shaft and mounted for sliding movement thereon, said cylindrical control member having shoulders projecting therefrom respectively cooperable with the projections on said friction shoes for retaining the latter disengaged from the clutch drum irrespective of the speed of said shaft, said cylindrical control member being movable so as to disengage the shoulders thereon from the projections on said friction shoes to thereby enable engagement of the shoes with said drum in response to said centrifugal force, and a compression spring disposed within an opening formed in the end of said shaft and acting against said control member and normally effective to bias it toward a position in which the shoulders thereon engage the projections on the friction shoes and thus retain the latter disengaged from said clutch drum.

6. In combination, a driving shaft, a first drive member secured to rotate with said shaft, a second drive member rotatably mounted with respect to said shaft, clutch means for drivingly interconnecting said second drive member and said shaft and comprising a clutch drum drivingly connected with said second drive member and centrifugally responsive friction shoes drivingly connected with said shaft and engageable with said drum above a predetermined speed of said shaft, each of said friction shoes including means defining a retaining projection thereon, a control member having shoulder means thereon respectively cooperable with the projection on each of said friction shoes for retaining the latter disengaged from the clutch drum irrespective of the speed of said shaft, said control member being movable so as to disengage the shoulder means thereon from the projections on said friction shoes to thereby enable engagement of the shoes with said drum in response to centrifugal force, resilient means acting on said control member and normally effective to bias it toward a position where the shoulder means thereon engage the projections on the friction shoes and thus retain the latter disengaged from said clutch drum, and an actuator for said control member effective to move the control member so as to disengage the shoulder means thereon from the projections on said friction shoes.

7. In combination, a driving shaft, a first drive member secured to rotate with said shaft, a second drive member rotatably mounted with respect to said shaft, clutch means for drivingly interconnecting said second drive member and said shaft and comprising a clutch drum drivingly connected with said second drive member and centrifugally responsive friction shoes drivingly connected with said shaft and engageable with said drum above a predetermined speed of said shaft, each of said friction shoes including means defining a retaining projection thereon, a cylindrical control member disposed over the end of said shaft and mounted for sliding movement thereon, said cylindrical control member having shoulders projecting therefrom respectively cooperable with the projections on said friction shoes for retaining the latter disengaged from the clutch drum irrespective of the speed of said shaft, said cylindrical control member being movable so as to disengage the shoulders thereon from the projections on said friction shoes to thereby enable engagement of the shoes with said drum in response to said centrifugal force, a compression spring disposed within an opening formed in the end of said shaft and acting against said control member and normally effective to bias it toward a position in which the shoulders thereon engage the projections on the friction shoes and thus retain the latter disengaged from said clutch drum, and an actuating solenoid having an armature effective upon energization of the solenoid to move the cylindrical control member so as to disengage the shoulders thereon from the projections on said friction shoes.

8. Means for controlling the engagement of a centrifugal clutch operably disposed between drive and driven shafts wherein the centrifugal clutch includes a clutch drum drivingly connected with the driven shaft and a plurality of centrifugal force responsive friction shoes operably connected with said drive shaft and engageable with the drum above a predetermined speed of rotation of the drive shaft and comprising, in combination, an electric motor for driving the drive shaft, means defining retaining projections on each of said shoes, the control member having shoulder means thereon respectively cooperable with the projections on each of the friction shoes for retaining the latter disengaged from the drum irrespective of the speed of the drive shaft, means tending to bias said control member toward a position wherein the shoulder means thereon respectively engage the projections on the friction shoes to hold the latter out of engagement with the clutch drum, an energizing circuit for said motor including first and second switches each of which, when closed, is effective to complete said energizing circuit, said first switch being operably connected with said control member and effective to complete the motor circuit when the control member is biased by the biasing means, and an actuating solenoid having an armature operably connected with said second switch and effective upon energization of the solenoid to move the control member against the biasing means to enable engagement of the friction shoes with the clutch drum and said second switch, at this time, maintaining said motor circuit completed.

9. Means for controlling the engagement of a centrifugal clutch operably disposed between drive and driven shafts wherein the centrifugal clutch includes a clutch drum drivingly connected with the driven shaft and a plurality of centrifugal force responsive friction shoes operably connected with said drive shaft and engageable with the drum above a predetermined speed of rotation of the drive shaft and comprising, in combination, an electric motor for driving the drive shaft, means defining retaining projections on each of said shoes, the control member having shoulder means thereon respectively cooperable with the projections on each of the friction shoes for retaining the latter disengaged from the drum irrespective of the speed of the drive shaft, means tending to bias said control member toward a position wherein the shoulder means thereon respectively engage the projections on the friction shoes to hold the latter out of engagement with the clutch drum, an energizing circuit for said motor including first and second switches each of which, when closed, is effective to complete said energizing circuit, said first switch being operably connected with said control member and effective to complete the motor circuit when the control member is biased by the biasing means, an actuating solenoid having an armature operably connected with said second switch and effective upon energization of the solenoid to move the control member against the biasing means to enable engagement of the friction shoes with the clutch drum and said second switch, at this time, maintaining said motor circuit completed, and blocking means on said friction shoe retaining projections effective to prevent return movement of the control member under the urging of said biasing means and, in turn, holding said first switch open, whereby upon deenergization of said solenoid both switches remain open and said energizing circuit remains broken until the friction shoes decelerate sufficiently to retract and enable return engagement of said shoulders and said retaining projections whereupon said first switch is automatically closed to again complete the motor energizing circuit.

10. A centrifugal clutch comprising, in combination, a driving member including a spider having a hub with a plurality of peripherally spaced radially extending arms, said driving member also including a plurality of friction shoes respectively slidably mounted on said spider arms, resilient means acting to bias said friction shoes radially inwardly toward said spider in opposition to said centrifugal force which acts to throw the shoes radially outwardly upon rotation thereof, a driven member comprising a cylindrical drum engageable by said shoes when they are thrown radially outwardly by centrifugal force, a generally cylindrically shaped control member having axially extending portions disposed substantially concentrically between the spider hub and the friction shoes and each axially extending portion having a retaining projection thereon, and each of said friction shoes having a projection thereon respectively cooperable with the control member projections for holding the shoes disengaged from the drum irrespective of the centrifugal force acting on the shoes.

11. A centrifugal clutch comprising, in combination, a driving member including a spider having a hub with a plurality of peripherally spaced radially extending arms, said driving member also including a plurality of friction shoes respectively slidably mounted on said spider arms, resilient means acting to bias said friction shoes radially inwardly toward said spider in opposition to said centrifugal force which acts to throw the shoes radially outwardly upon rotation thereof, a driven member comprising a cylindrical drum engageable by said shoes when they are thrown radially outwardly by centrifugal force, a generally cylindrically shaped control member having axially extending portions disposed substantially concentrically between the spider hub and the friction shoes and each axially extending portion having a retaining projection thereon, each of said friction shoes having a projection thereon respectively cooperable with the control member projections for holding the shoes disengaged from the drum irrespective of the centrifugal force acting on the shoes, and biasing means normally acting on said control member in a manner tending to retain said cooperable projections engaged and, in turn, maintain the clutch disengaged.

12. A centrifugal clutch comprising, in combination, a driving member including a spider having a hub with a plurality of peripherally spaced radially extending arms, said driving member also including a plurality of friction shoes respectively slidably mounted on said spider arms, resilient means acting to bias said friction shoes radially inwardly toward said spider in opposition to said centrifugal force which acts to throw the shoes radially outwardly upon rotation thereof, a driven member comprising a cylindrical drum engageable by said shoes when they are thrown radially outwardly by centrifugal force, a generally cylindrically shaped control member having axially extending portions disposed substantially concentrically between the spider hub and the friction shoes and each axially extending portion having a retaining projection thereon, each of said friction shoes having a projection thereon respectively cooperable with the control member projections for holding the shoes disengaged from the drum irrespective of the centrifugal force acting on the shoes, the cooperable portions of said projections comprising engageable substantially complementary mating surfaces disposed at an acute angle to the axis of rotation of the clutch whereby the control member can be actuated to disengage the cooperable projections even though the friction shoes are being urged radially outwardly by centrifugal force.

13. A centrifugal clutch comprising, in combination, a driving member including a spider having a hub with a plurality of peripherally spaced radially extending arms, said driving member also including a plurality of friction shoes respectively slidably mounted on said spider arms, resilient means acting to bias said friction shoes radially inwardly toward said spider in opposition to said centrifugal force which acts to throw the shoes radially outwardly upon rotation thereof, a driven member comprising a cylindrical drum engageable by said shoes when they are thrown radially outwardly by centrifugal force, a generally cylindrically shaped control member having axially extending portions disposed substantially concentrically between the spider hub and the friction shoes and each axially extending portion having a retaining projection thereon, each of said friction shoes having a projection thereon respectively cooperable with the control member projections for holding the shoes disengaged from the drum irrespective of the centrifugal force acting on the shoes, the cooperable portions of said projections comprising engageable substantially complementary mating surfaces disposed at an acute angle to the axis of rotation of the clutch whereby the control member can be actuated to disengage the cooperable projections even though the friction shoes are being urged radially outwardly by centrifugal force, and blocking means on each of said friction shoe projections engageable with the control member projections when the friction shoes are in engagement with the driven clutch drum for thereby preventing movement of the control member to a position wherein its projections cooperate with the projections on the friction shoes until the friction shoes decelerate sufficiently to retract from engagement with the cylindrical drum.

14. A centrifugal clutch comprising, in combination, a driving member including a spider having a hub with a plurality of peripherally spaced radially extending arms, said driving member also including a plurality of friction shoes respectively slidably mounted on said spider arms, resilient means acting to bias said friction shoes radially inwardly toward said spider in opposition to said centrifugal force which acts to throw the shoes radially outwardly upon rotation thereof, a driven member comprising a cylindrical drum engageable by said shoes when they are thrown radially outwardly by centrifugal force, a generally cylindrically shaped control member having axially extending portions disposed substantially concentrically between the spider hub and the friction shoes and each axially extending portion having a retaining projection thereon, each of said friction shoes having a projection thereon respectively cooperable with the control member projections for holding the shoes disengaged from the drum irrespective of the centrifugal force acting on the shoes, the cooperable portions of said projections comprising engageable substantially complementary mating surfaces disposed at an angle of the order of 5° to the axis of rotation of the clutch whereby the control member can be actuated to disengage the cooperable projections even though the friction shoes are being urged radially outwardly by centrifugal force.

No references cited.